Patented Oct. 24, 1922.

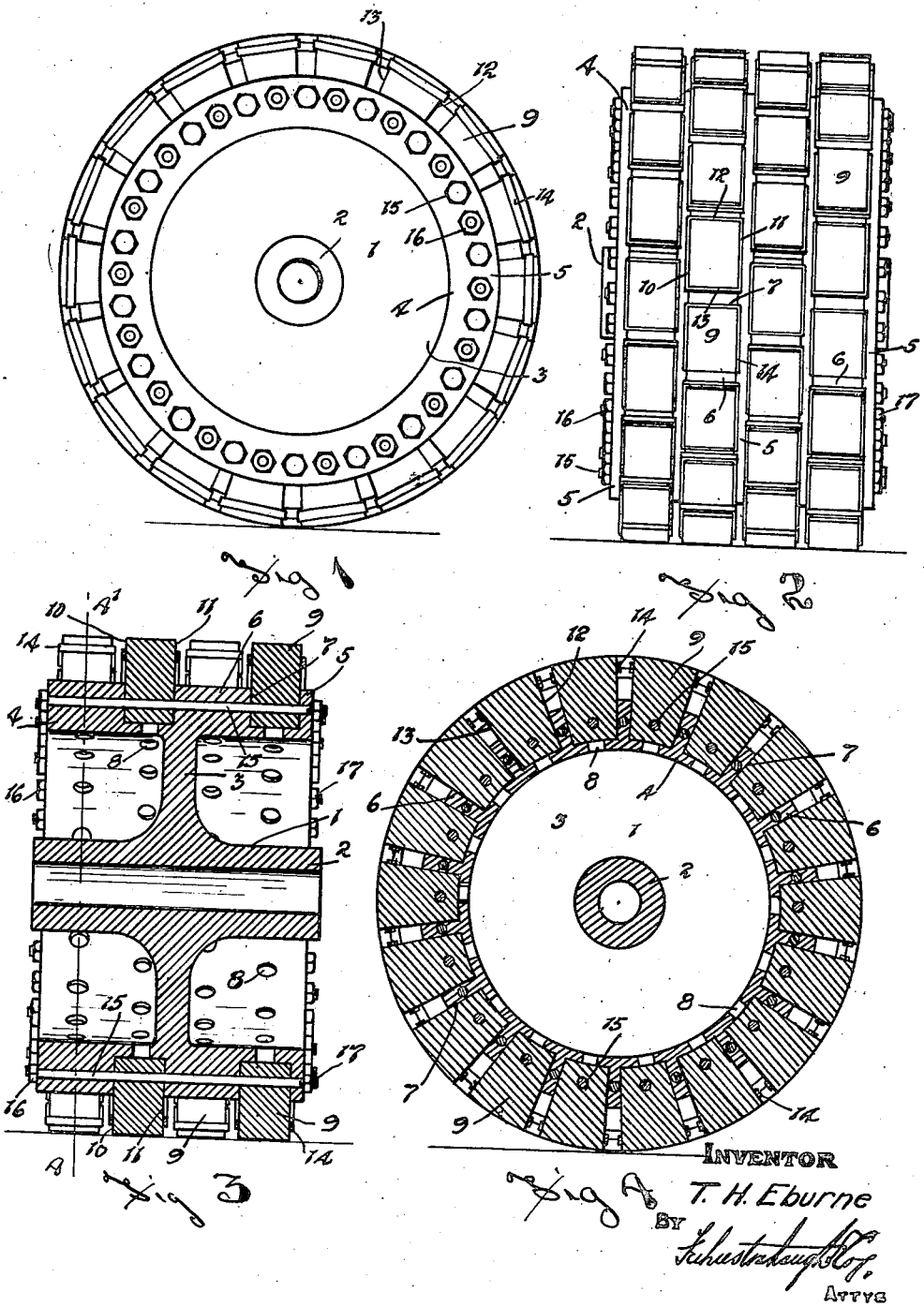

1,432,984

UNITED STATES PATENT OFFICE.

THOMAS H. EBURNE, OF WINNIPEG, MANITOBA, CANADA.

TRACTION TREAD.

Application filed June 24, 1920. Serial No. 391,304.

*To all whom it may concern:*

Be it known that I, THOMAS H. EBURNE, a subject of the King of Great Britain, and a resident of the city of Winnipeg, in the Province of Manitoba, Canada, have invented certain new and useful Improvements in Traction Treads, of which the following is the specification.

The invention relates to improvements in traction treads and particularly to a tread for a truck or such vehicle designed for heavy loads and the object of the invention is to provide a traction wheel having a comparatively large tread and with the tread face of the wheel presenting a plurality of pockets receiving removable wearing plugs which can be renewed from time to time as occasion may demand.

A further object of the invention is to construct the wheel so that it can be readily cast with the pockets therein and so that the plugs can be quickly inserted and fastened in the pockets.

With the above more important objects in view the invention consists essentially in a cast wheel presenting a hub and rim and with the tread side of the rim provided with a plurality of pockets, plugs inserted in the pockets and forming the tread face of the wheel and means for detachably fastening the plugs in the pockets, the parts being arranged and constructed as hereinafter more particularly described and later pointed out in the appended claim, reference being had to the accompanying drawing in which:—

Fig. 1 is a side view of a wheel constructed in accordance with my invention.

Fig. 2 is a front view thereof.

Fig. 3 is a vertical sectional view centrally through the wheel.

Fig. 4 is a vertical sectional view at 4—4' Fig. 3.

In the drawing like characters of reference indicate corresponding parts in the several figures.

1 represents the wheel which in the present instance presents a comparatively long hub 2 from which extends centrally a flange 3 which carries the rim 4, the flange actually taking the place of the customary spokes of a wheel. The rim in the present instance is comparatively wide and is provided on its exterior face with a plurality of circumferentially directed webs 5 and transversely extending webs 6, the circumferential and transverse webs forming a plurality of similar regularly arranged tapering pockets 7 on the outer face of the rim. These pockets are substantially square in cross section and increase in area due to the taper in passing outwardly from the rim.

The cross webs 6 between the webs 5 are arranged in staggered relation so that adjoining circumferentially directed rows of pockets are in staggered relation.

In the present instance I have shown four circumferential rows of pockets and have provided the rim of the wheel with a knockout opening 8 at the base of each pocket, the openings being accessible from the inner side of the rim. The pockets are designed to receive tapering tread blocks or plugs 9 having a length considerably deeper than the pockets so that when the plugs are inserted in the pockets they project considerably there-beyond.

All the plugs are identical, each presenting straight sides 10 and 11 and tapering ends 12 and 13 whereby the plugs all lie with their sides parallel when in the pockets and their ends radiating from the hub. These plugs will be made from hard wood or such like and the outer or large end of each plug is bound with a metal binding strip or ferrule 14 to prevent it from splitting. The plugs are held firmly in place by cross bolts 15 passing centrally across the pockets and through the inner ends of the plugs, the bolts being provided at their ends with removable nuts 16 and 17.

Here it is to be observed that each bolt passes in the present instance across two pockets through two cross webs and through all circumferentially directed webs.

Whilst I have shown a wheel constructed with four circumferentially directed rows of pockets I wish it to be distinctly understood that the number of rows can be increased or diminished depending on the tread surface desired.

From the above disclosure it will be apparent that this wheel can be very cheaply constructed and that it forms a particularly serviceable wheel for trucks and such like. If at any time any of the plugs become unduly worn they can be readily removed by drawing the associated bolt and knocking out the worn plugs by a tool inserted through the openings 8 and then inserting new plugs to take the place of the discarded ones.

What I claim as my invention is:—

A traction wheel comprising an elongated hub, an integral web extending outwardly from the hub at a point intermediate the length of the latter and a relatively wide rim integral with said web and extending an appreciable distance upon opposite sides of the web, said rim presenting a plurality of exterior pockets, outwardly diverging end walls and straight side walls separating said exterior pockets, said pockets having knock-out openings therethrough, tread blocks filling the pockets and extending therebeyond and having their inner ends seated on the rim, and removable cross bolts retaining the blocks in the pockets.

Signed at Winnipeg, this 22d day of May, 1920.

THOMAS H. EBURNE.

In the presence of—
G. S. ROXBURGH,
K. B. WAKEFIELD.